United States Patent

[11] 3,604,601

| [72] | Inventor | Gerald G. Boling |
| | | 816 Sixth Ave., Leavenworth, Kans. 66048 |
| [21] | Appl. No. | 861,270 |
| [22] | Filed | Sept. 23, 1969 |
| [45] | Patented | Sept. 14, 1971 |

[54] FISH FEEDING APPARATUS
6 Claims, 4 Drawing Figs.

[52] U.S. Cl. .................................................. 222/305,
119/51, 119/56
[51] Int. Cl. ............................................... A01k 61/02
[50] Field of Search .......................................... 119/51.11,
51, 5, 56; 222/305, 368, 307

[56] References Cited
UNITED STATES PATENTS
1,077,999  11/1913  Rees .............................. 222/308

| 2,785,831 | 3/1957 | Smolin | 222/305 X |
| 2,793,791 | 5/1957 | Clark | 119/56 X |
| 2,981,229 | 4/1961 | Brown | 119/56 |
| 3,029,002 | 4/1962 | Gregoire | 222/307 |

*Primary Examiner*—Hugh R. Chamblee
*Attorney*—John A. Hamilton

ABSTRACT: A fish-feeding apparatus consisting of a hopper for containing a feed material for fish and having a restricted bottom opening disposed above the water level, a rotatable cylindrical dispenser member disposed horizontally in and obstructing said hopper opening, but having a groove formed longitudinally therein for receiving said feed material therein, means for rotating said dispenser cylinder, and a regulating shutter member disposed above said dispenser cylinder and movable longitudinally thereof to expose greater or lesser lengths of said groove to said hopper.

PATENTED SEP 14 1971      3,604,601
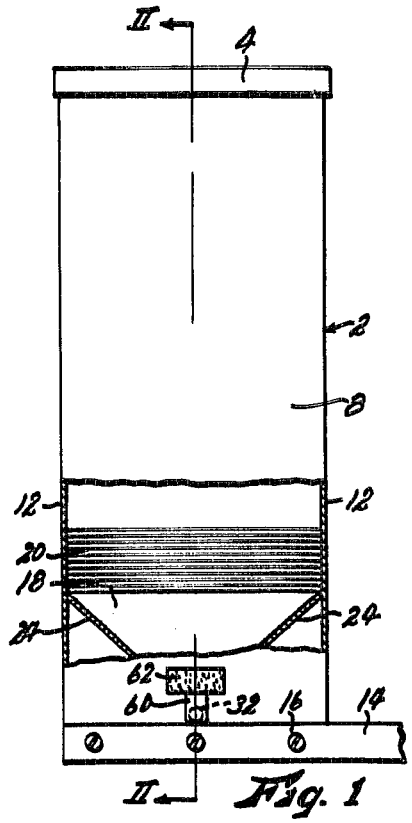
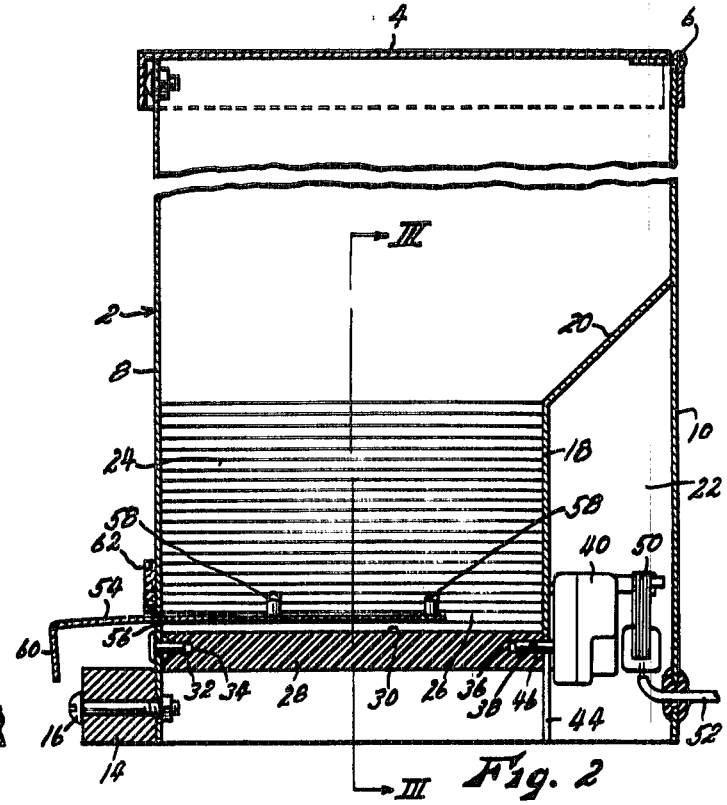
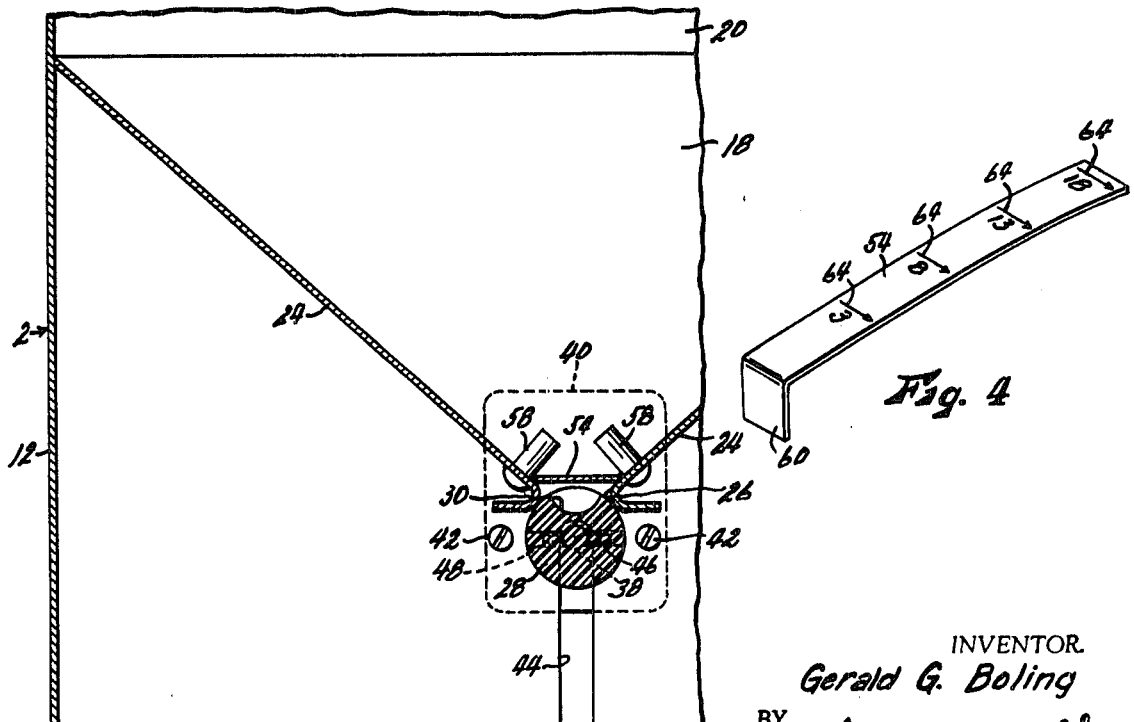
Fig. 1
Fig. 2
Fig. 3
Fig. 4
INVENTOR.
Gerald G. Boling
BY John A. Hamilton
Attorney.

FISH FEEDING APPARATUS

This invention relates to new and useful improvements in apparatus for feeding fish, and has particular reference to fish-feeding apparatus of the type consisting of a feed dispenser disposed above the water and operable to drop said feed into the water.

Problems have arisen in connection with this general type of feeders, particularly as relates to the rate at which they dispense the feed. It is of course obvious that the dispensing rate should be accommodated to the fish population affected, in order to assure an adequate supply of feed, but without wastage thereof. It is also well known that many species of fish, while they will take feed material which is floating on the water, or suspended, in the water, will not take feed resting on the bottom so that feed dropped into the water and allowed to sink to the bottom is wasted. Thus, in dispensing even a given amount of feed which may be determined adequate for particular time periods, it should be dispensed gradually within that time period, in order to insure consumption thereof before it can sink to the bottom.

Accordingly, the object of the present invention is the provision of a fish feeding apparatus of the dispenser type in which the dispensing rate can easily and quickly be adjusted over an extremely wide range. Generally, this object is accomplished by the provision of an apparatus having a power-driven dispenser operable to dispense a quantity of feed at periodic intervals, and means for adjusting the quantity of feed to be dispensed at each of these intervals. Further variation of the dispensing rate may be provided by the use of easily interchangeable parts in the dispenser.

Other objects are extreme simplicity and economy of construction, and efficiency, dependability, and economy of operation.

With these objects in view, as well as other objects which will appear in the course of the specification, reference will be had to the accompanying drawing, wherein:

FIG. 1 is a front elevational view, partially broken away, of a fish-feeding apparatus embodying the present invention, FIG. 2 is an enlarged, foreshortened sectional view taken on line II—II of FIG. 1, FIG. 3 is an enlarged, fragmentary sectional view taken on line III—III of FIG. 2, and FIG. 4 is a perspective view of the shutter member.

Like reference numerals apply to similar parts throughout the several views, and the numeral 2 applies generally to a hopper body formed of sheet metal. Said hopper is horizontally rectangular and is vertically elongated, being substantially open at its lower end and being provided at its upper end with a cover 4 hinged thereto at 6. Said hopper includes a front wall 8, back wall 10, and sidewalls 12, and is adapted to be supported over a body of water by a horizontal beam 14 secured to front wall 8 thereof by bolts 16, it being understood that the opposite end of said beam is affixed to a dock or other shore installation, not shown.

In the lower portion of body 2, there is provided a vertical partition walls 18 parallel to front and backwall 8 and 10, and extending upwardly from the bottom of the hopper body, the upper portion of wall 18 being angled upwardly and rearwardly, as indicated at 20 and affixed to back wall 10, thus forming an open-bottomed motor chamber 22 between walls 10 and 18. Between walls 8 and 18, a pair of inclined walls 24 are fixed at their upper edges to sidewalls 12 of the hopper body, and slope downwardly toward the lateral midline of said body, thus forming a hopper bottom. The lower edges of walls 24 are spaced laterally apart to form a narrow rectangular discharge opening 26, the major axis of which extends forwardly and rearwardly between walls 8 and 18.

Discharge opening 26 is completely obstructed by a rotatable cylindrical dispenser member 28, said dispenser member being horizontal and parallel to the major axis of opening 26, the lower edges of walls 24 contacting or nearly contacting the periphery thereof, as shown in FIG. 3. Said dispenser member extends from wall 8 to wall 18, and is substantially solid except for a longitudinal groove 30 formed therein and extending the full length thereof. It may be formed of any suitable inexpensive material, such as plastic. At its forward end it is axially journaled on a stud 32 fixed in front wall 8, said stud being engaged in a socket 34 formed axially in the forward end of dispenser member 28. At its rearward end, member 28 has a socket 36 formed axially therein, in which is engaged the output shaft 38 of a gear reduction unit 40 disposed in motor chamber 22 and affixed to wall 18 by a pair of screws 42 (see FIG. 3). Shaft 38 projects through a slot 44 formed in wall 18, said slot opening through the lower edge of wall 18. Affixed in the projecting portion of shaft 38 is a lateral pin 46 which is engaged in a diametric slot 48 formed in member 28 in intersecting relation to socket 36, whereby rotation of shaft 38 is transmitted to member 28. Reduction unit 40 is driven by a small electric motor 50 mounted directly thereon, and to which electric current is furnished either by a supply cable 52 from a remote source of electric power, as shown, or from an electric battery, not shown, which could be housed in chamber 22. Said chamber is large enough to contain such a battery if desired.

A shutter member 54 is disposed directly above dispenser member 28, and consists of an elongated strip of metal extending parallel with member 28, being inserted through a slot 56 formed in front body wall 8, and being longitudinally slidable to extend any desired distance toward back wall 18. Its opposite longitudinal edges rest respectively against the upper surfaces of inclined hopper walls 24, so as to bridge discharge opening 26, and is held down against said inclined hopper walls by pegs 58 fixed in said walls and inclined to overhang said shutter member, as best shown in FIG. 3. The extended end portion of said shutter member is bent downwardly to form a finger tab 60 which may conveniently be grasped to adjust said shutter inwardly or outwardly. Said shutter member is formed of a resilient metal, and as best shown in FIG. 4 is normally somewhat bowed. Thus, as it is slid into position over dispenser 28, it is forced into straight linear form by its inclusion between walls 24 and pegs 58, and is thereby held frictionally at any desired position of adjustment. A pad 62 of suitable sponge material may be adhered to the outer surface of front body wall 8, just above shutter slot 56, to prevent rain or the like from entering said slot, where it could moisten, and hence interfere with the flow, of the feed material, which is normally of a dry, granular form.

Operation of the feeding apparatus is deemed quite apparent. When hopper 2 is charged with dry, granular feed material and motor 50 set in operation to rotate dispenser member 28, it will be seen that each time in the rotation of said dispenser member that groove 30 thereof is turned upwardly into registry with discharge opening 26 of the hopper, the portion of said groove not covered by shutter 54 will be filled by gravity with feed material from the hopper, and that when said groove is next turned out of registry with opening 26 into a downwardly opening position, the feed falls therefrom through the open bottom of the hopper body into the water below, so as to be available to fish therein.

For reasons already discussed, it is quite important to be able to adjust the rate of feed dispensing by the apparatus over a wide range. As thus far described, it will be apparent that with a dispenser cylinder 28 having a groove 30 of a given cross-sectional area and with said cylinder rotating at a given speed, the dispensing rate will depend on the effective length of said groove, the effective length thereof being that portion thereof not covered by shutter 54. This effective length may of course be adjusted by sliding said shutter inwardly or outwardly through slot 56, and the upper surface of said shutter may have suitable longitudinally spaced indicia 64 imprinted thereon, to be indexed selectively with wall 8 to indicate various predetermined dispensing rates. Said indicia marks could, for example, be calibrated to indicate the dispensing rate in ounces of feed per hour, or any other convenient unit.

However, variation of the dispensing rate over much wider ranges can be obtained by interchanging dispenser cylinder 28 with other cylinders having grooves 30 of different cross-sectional areas, or having multiple grooves instead of a single groove as shown, or by changing the speed of rotation of said cylinder. It will be seen that the present structure greatly facilitates these variations, in that by the simple removal of the two screws 42, motor-reducer unit 50–40 may be dropped from the lower end of chamber 22, shaft 38 passing through slot 44, and in so doing also frees dispenser member 28 for removal from stud 32. Thus the dispenser member may easily be interchanged for other housing grooves of different depths and/or widths, or a different member of grooves. Said dispenser cylinders are easily manufactured from inexpensive materials, such as plastic rod, at very low cost. The suspension of said cylinder only by studs at its ends permits virtually the entire interior portion thereof to be hollowed out, if desired. Also, motor-reducer unit 50–40 may be interchanged for others in which output shafts 38 turn at different speeds. Such motor-reducer units are commercially available in many different output speeds, being commonly employed in many low-power applications such as for driving electric clocks and timers. In the range of power required to operate the present apparatus, which is extremely low, such units are quite inexpensive, and operate with extremely low power consumption.

While I have shown and described a specific embodiment of my invention, it will be readily apparent that many minor changes of structure and operation could be made without departing from the spirit of the invention.

What I claim as new and desire to protect by Letters Patent is:

1. A fish-feeding apparatus comprising:
  a. a hopper adapted to contain a granular feed material and having a horizontally rectangular discharge opening at its bottom and extending between opposed converging walls of said hopper, and adapted to be disposed over a body of water containing fish,
  b. a cylindrical dispenser member carried by said hopper and obstructing said discharge opening, said dispenser member being rotatable about its axis which is parallel to the major axis of said opening, the periphery of said cylinder moving in close proximity to opposed edges of said converging walls defining said opening, and said dispenser member having a groove formed longitudinally in the peripheral surface thereof to constitute a chamber operable by rotation of said dispenser member to open alternately upwardly into said hopper through said discharge opening and downwardly from said hopper,
  c. power means carried by said hopper and operable to rotate said dispenser member at a uniform speed, and
  d. a removable shutter member extending through a slot provided in a wall of said hopper in closely spaced relation above said dispenser member and being slidable in the direction of the axis of said dispenser member and engaging said converging walls of said hopper to support the same whereby the portion of said groove exposed to the interior of said hopper through said discharge opening may be varied.

2. A fish-feeding apparatus as recited in claim 1 wherein said hopper provides guideways for said shutter which are linearly straight in the direction of travel of said shutter, and wherein said shutter is formed of resilient material and is normally bowed longitudinally to its direction of travel, whereby it is resiliently straightened by said guideways and held frictionally at any desired position of adjustment.

3. A fish-feeding apparatus as recited in claim 1 wherein said shutter projects slidably through a slot formed in an exterior wall of said housing, whereby to be easily grasped and adjusted manually, and wherein said shutter is provided with indicia imprinted thereon to be indexed at said exterior wall to indicate the exposed portion of said dispenser groove.

4. A fish-feeding apparatus as recited in claim 1 wherein said dispenser cylinder is detachably mounted in said hopper and constitutes one of a plurality of interchangeable cylinders differing as to the number and cross-sectional areas of the grooves formed therein.

5. A fish-feeding apparatus as recited in claim 1 wherein said power means constitutes a self-contained electric motor-speed reducer unit detachably mounted in said hopper, and is one of a plurality of interchangeable units of like nature differing as to the output speed thereof.

6. A fish-feeding apparatus as recited in claim 1 wherein said hopper includes a pair of vertical walls between which said dispenser cylinder extends normally thereto, wherein one end of said cylinder is axially socketed and engaged rotatably and detachably over a stud fixed in the first of said vertical walls, and wherein the opposite end of said dispenser cylinder is socketed and engaged nonrotatably and detachably over the output shaft of said power means, said power means being detachably mounted on the second of said vertical walls at the side thereof opposite to said cylinder with its output shaft extending through a slot formed in said wall, said slot opening through a free edge of said wall.